US012791176B2

(12) United States Patent
Brush et al.

(10) Patent No.: US 12,791,176 B2
(45) Date of Patent: Nov. 10, 2026

(54) HANDHELD LIGHTING DEVICE AND RELATED METHODS

(71) Applicant: Harbor Freight Tools USA, Inc., Calabasas, CA (US)

(72) Inventors: James Andrew Brush, Mauldin, SC (US); Justin Palatsky, Calabasas, CA (US)

(73) Assignee: Harbor Freight Tools USA, Inc., Calabasas, CA (US)

( * ) Notice: Subject to any disclaimer, the term of this patent is extended or adjusted under 35 U.S.C. 154(b) by 0 days.

(21) Appl. No.: 19/091,690

(22) Filed: Mar. 26, 2025

(65) Prior Publication Data

US 2026/0298455 A1 Oct. 1, 2026

(51) Int. Cl.
*F21V 23/04* (2006.01)
*F21L 4/04* (2006.01)
(Continued)

(52) U.S. Cl.
CPC ............ *F21V 23/0414* (2013.01); *F21L 4/04* (2013.01); *F21V 14/025* (2013.01);
(Continued)

(58) Field of Classification Search
CPC .. F21V 23/0414; F21V 23/0492; F21V 4/025; F21V 21/0885; F21V 21/406; F21V 33/0084; F21L 4/04
See application file for complete search history.

(56) References Cited

U.S. PATENT DOCUMENTS 5,988,828 A * 11/1999 Prince .................. F21V 21/145 362/202
D421,143 S 2/2000 Kovacik et al.
(Continued)

FOREIGN PATENT DOCUMENTS

CN 302590446 S 9/2013
CN 303971592 S 12/2016
(Continued)

OTHER PUBLICATIONS

Harbor Freight, Bauer 20V Cordless, 295 Lumen Stick Light—Tool Only, https://www.harborfreight.com/20v-cordless-295-lumen-stick-light-tool-only-57146.html (Year: 2020).*
(Continued)

*Primary Examiner* — James R Greece
*Assistant Examiner* — Michael Chiang
(74) *Attorney, Agent, or Firm* — Foley & Lardner LLP

(57) ABSTRACT

A portable handheld light may include a housing extending along a center longitudinal axis and including: a first end, a second end opposite the first end, a grip extending between the first end and the second end; and a channel extending from a left side to a right side of the housing. The light may include a light source rotatably coupled to the housing proximate the first end. The light may include an energy storage device selectively coupled to the housing proximate the second end. The light may include a user interface coupled to the energy storage device and the light source to selectively control operation of the light source, the user interface comprising: a first switch; and a second switch positioned at least partially within the channel, wherein the second switch extends beyond the channel on the left side and the right side of the housing.

20 Claims, 9 Drawing Sheets

(51) Int. Cl.

| | |
|---|---|
| ***F21V 14/02*** | (2006.01) |
| ***F21V 21/088*** | (2006.01) |
| ***F21V 21/40*** | (2006.01) |
| *F21W 131/10* | (2006.01) |
| *F21Y 115/10* | (2016.01) |

(52) U.S. Cl.

CPC ........ *F21V 21/0885* (2013.01); *F21V 21/406* (2013.01); *F21V 23/0492* (2013.01); *F21W 2131/1005* (2013.01); *F21Y 2115/10* (2016.08)

(56) References Cited

U.S. PATENT DOCUMENTS

| | | | | |
|---|---|---|---|---|
| 7,150,540 | B2 | 12/2006 | Kovacik et al. | |
| 7,325,944 | B2 | 2/2008 | Kovacik et al. | |
| 7,553,051 | B2 | 6/2009 | Brass et al. | |
| D656,646 | S | 3/2012 | Kawase et al. | |
| D691,310 | S | 10/2013 | Zhou et al. | |
| 8,562,184 | B2 | 10/2013 | Klipstein et al. | |
| D739,063 | S | 9/2015 | Su | |
| D742,569 | S | 11/2015 | Dorman | |
| 9,297,509 | B2 | 3/2016 | Klipstein et al. | |
| 9,360,177 | B2 * | 6/2016 | Mueckl | F21V 21/06 |
| D768,321 | S | 10/2016 | Inskeep | |
| 9,464,767 | B2 | 10/2016 | Whitfield et al. | |
| 9,541,244 | B1 | 1/2017 | Berezinski et al. | |
| 9,851,082 | B2 | 12/2017 | Thompson et al. | |
| 10,119,686 | B2 | 11/2018 | Sharrah et al. | |
| D840,075 | S | 2/2019 | Bao | |
| 10,203,090 | B1 | 2/2019 | Zhu | |
| D850,684 | S | 6/2019 | Zhang | |
| D853,609 | S | 7/2019 | Uematsu et al. | |
| 10,344,951 | B2 * | 7/2019 | Aoki | F21L 4/027 |
| 10,753,553 | B2 | 8/2020 | Gross et al. | |
| D898,258 | S | 10/2020 | Bao | |
| D898,259 | S | 10/2020 | Bao | |
| D904,658 | S | 12/2020 | Bao | |
| 10,948,139 | B2 | 3/2021 | Mclennan | |
| 10,948,166 | B2 | 3/2021 | Ohara et al. | |
| 10,962,180 | B2 | 3/2021 | Cacciabeve | |
| 11,098,858 | B2 * | 8/2021 | Westling | F21V 21/0965 |
| 11,448,383 | B2 | 9/2022 | Harvey et al. | |
| D983,429 | S | 4/2023 | Mei | |
| D988,556 | S | 6/2023 | Wang | |
| 11,732,847 | B2 | 8/2023 | Hopkins et al. | |
| D1,001,329 | S | 10/2023 | Mei | |
| D1,115,120 | S | 2/2026 | Zheng | |
| 2005/0265035 | A1 | 12/2005 | Brass et al. | |
| 2009/0134191 | A1 * | 5/2009 | Phillips | B25F 5/02 362/183 |
| 2015/0136434 | A1 * | 5/2015 | Aoki | B25F 5/02 248/691 |
| 2015/0267902 | A1 | 9/2015 | Zhang | |
| 2018/0054866 | A1 | 2/2018 | Kruse et al. | |
| 2018/0224077 | A1 | 8/2018 | Bian | |
| 2018/0340661 | A1 * | 11/2018 | Inskeep | F21V 14/025 |
| 2022/0221115 | A1 * | 7/2022 | Hopkins | F21L 4/027 |
| 2023/0075761 | A1 | 3/2023 | Sergyeyenko et al. | |
| 2023/0364756 | A1 * | 11/2023 | Hozumi | F21V 29/503 |
| 2023/0366533 | A1 * | 11/2023 | Chikaraishi | B25F 5/02 |

FOREIGN PATENT DOCUMENTS

| | | | |
|---|---|---|---|
| CN | 304281202 | S | 9/2017 |
| CN | 305012033 | S | 1/2019 |
| CN | 208634956 | U | 3/2019 |
| CN | 305261806 | S | 7/2019 |
| CN | 210219373 | U | 3/2020 |
| CN | 211551533 | U | 9/2020 |
| CN | 211925441 | U | 11/2020 |
| CN | 211925471 | U | 11/2020 |
| CN | 211925480 | U | 11/2020 |
| CN | 306280365 | S | 1/2021 |
| CN | 112577023 | A | 3/2021 |
| CN | 306564732 | S | 5/2021 |
| CN | 306605671 | S | 6/2021 |
| CN | 213810095 | U | 7/2021 |
| CN | 113432053 | A | 9/2021 |
| CN | 306967300 | S | 11/2021 |
| CN | 307143927 | S | 3/2022 |
| CN | 216564535 | U | 5/2022 |
| CN | 217482561 | U | 9/2022 |
| CN | 217482565 | U | 9/2022 |
| CN | 307601958 | S | 10/2022 |
| CN | 217736998 | U | 11/2022 |
| CN | 217816624 | U | 11/2022 |
| CN | 307640004 | S | 11/2022 |
| CN | 307653592 | S | 11/2022 |
| EP | 3 508 785 | B1 | 11/2023 |

OTHER PUBLICATIONS

Bourns. "EM14 &#x2013 14 mm Rotary Optical Encoder w/Switch". Mar. 31, 2015. PDF. 6 Pages.

Hercules 20V Cordless 280 Lumen Stick Light, [online], [retrieved Dec. 4, 2024], Retrieved from internet, https://www.harborfreight.com/20v-cordless-280-lumen-stick-light-tool-only-57145.html.

Ex Parte Quayle Action on Design U.S. Appl. No. 30/005,815 dated Mar. 26, 2026 (9 pages).

* cited by examiner

HANDHELD LIGHTING DEVICE AND RELATED METHODS

TECHNICAL FIELD

This disclosure relates to handheld tools, specifically portable tools such as handheld work lights.

BACKGROUND

Portable handheld lights are widely used on work sites to illuminate specific areas. They are particularly useful for those working in unfinished or confined spaces which may lack fixed lighting. Portable handheld lights are also versatile and easily manipulated by an operator. However, because portable handheld lights are often used to assist with other tasks, operators may only be able to manipulate the portable handheld lights with a single hand. Thus, it would be beneficial for a portable handheld light to be easily controllable with a single handle.

SUMMARY

At least one embodiment relates to a light including: a housing extending along a center longitudinal axis and including: a first end; a second end opposite the first end; a grip extending between the first end and the second end; and a channel extending from a left side of the housing to a right side of the housing; a light source rotatably coupled to the housing proximate the first end; an energy storage device selectively coupled to the housing proximate the second end; and a user interface coupled to the energy storage device and the light source to selectively control operation of the light source, the user interface including: a first switch; and a second switch positioned at least partially within the channel, wherein the second switch extends beyond the channel on the left side and the right side of the housing.

In some embodiments, a portion of the second switch between the left side and the right side is positioned within the channel.

In some embodiments, the second switch is positioned radially between the first switch and the center longitudinal axis.

In some embodiments, the light further includes: the first switch including an actuation axis wherein the first switch is configured to move along the actuation axis; and the second switch including a rotary switch with a rotary axis substantially parallel with the actuation axis. In some embodiments, the actuation axis is substantially perpendicular with the channel.

In some embodiments, the second switch includes a rotary dial positioned in the channel and coupled to a rotary encoder base positioned within the housing.

In some embodiments, the first switch and the second switch are positioned within the grip of the housing.

In some embodiments, the light source is a plurality of lights sources.

In some embodiments, the light further includes: a controller configured to: receive a first user input from the user interface; control one or more of the plurality of light sources based on the first user input; receive a second user input from the user interface; and control a characteristic of the one or more of the plurality of light sources based on the second user input.

In some embodiments, the first user input is from one of the first switch or the second switch and the second user input is from the other of the first switch or the second switch.

Another embodiment relates to portable light, including: a housing including a first end and a second end opposite the first end; a plurality of light sources rotatably coupled to the housing proximate the first end; an energy storage device selectively coupled to the housing proximate the second end; a user interface coupled to the energy storage device and the plurality of light sources to selectively control operation of one or more of the plurality of light sources; and a controller configured to: receive a first user input from the user interface; control a first set of lights from the plurality of light sources based on the first user input; receive a second user input from the user interface; and control a characteristic of the one or more of the plurality of light sources based on the second user input.

In some embodiments, the controller is further configured to: receive a third user input from the user interface; and control a second set of lights from the plurality of light sources based on the third user input.

In some embodiments, the user interface includes a first switch and a second switch, wherein the controller is further configured to: receive the first user input from the first switch; and receive the second user input from the second switch; and receive the third user input from the first switch.

In some embodiments, the user interface includes a first switch and a second switch, wherein the controller is further configured to: receive the first user input from the first switch; and receive the second user input from the second switch.

In some embodiments, the first switch is a momentary switch and the second switch is a rotary encoder switch.

In some embodiments, the housing includes a channel extending from a left side of the housing to a right side of the housing, and wherein the second switch is positioned at least partially within the channel, and extends beyond the channel on the left side and the right side of the housing.

Another embodiment relates to a portable light, including: a first housing extending along a center longitudinal axis and including: a first end; a second end opposite the first end; and a grip extending between the first end and the second end; a second housing rotatably coupled to the first housing proximate the first end, the second housing including a plurality of light sources; an energy storage device selectively coupled to the first housing proximate the second end; a user interface coupled to the first housing to selectively control operation of one or more of the plurality of light sources, wherein the user interface includes: a first switch; and a second switch positioned at least partially w a controller configured to: receive a first input from the first switch; control a first set of light sources from the plurality of light sources based on the first input; and receive a second input from the first switch; and control a second set of light sources from the plurality light sources based on the second input, wherein the second set is different than the first set.

In some embodiments, the controller is further configured to: receive a third input from the second switch to adjust a characteristic of at least one of the first set of light sources or the second set of light sources. In some embodiments, the characteristics is a brightness.

In some embodiments, the portable light further includes a hook rotatably coupled to the first housing, the hook moveable between a first position wherein the hook and the first housing define an aperture and a second position wherein the hook is at least partially positioned within a groove of the housing.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION OF THE DRAWINGS

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

As shown generally in the FIGURES, a portable handheld light or a work light includes a housing with a light source rotatably coupled to the housing. The light source may comprise a first light on a first side of the light source and a second light on a second side of the light source opposite the first side. The work light may also include a user interface including a first switch, such as a momentary trigger switch, and a second switch, such as a rotary encoder switch. The first switch and the second switch may be used to control the operation and/or one or more characteristics of the first light and the second light, such as power on/off, brightness, color, flood size, focus, etc. The first light and the second light may be individually addressable, such that an operator may choose to operate the first light and the second light individually or concurrently. The light source may also be configured to rotate relative to the housing and the user interface to allow for further adjustment of the light generated by the light source.

Figure 1:
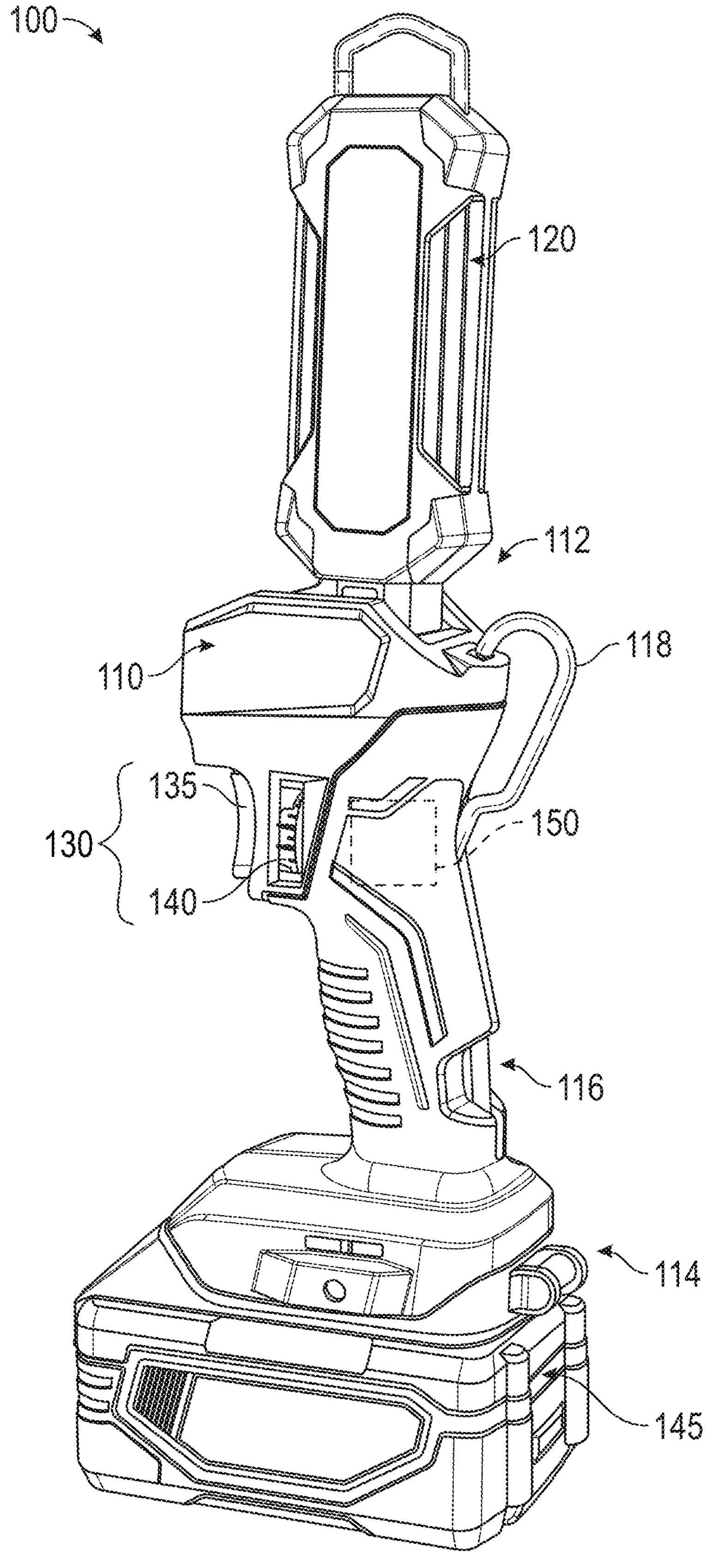
FIG. 1 is a perspective view of a work light, according to an exemplary embodiment.

Referring now to FIG. 1 a portable handheld light shown as work light 100 generally includes a housing 110 and a light source 120 coupled to the housing 110. Supported by the housing 110 is a user interface 130 for receiving one or more user inputs to control the light source 120. The user interface 130 includes a first switch 135 and a second switch 140. The housing 110 is further coupled to an energy storage device 145. The energy storage device 145 provides power to the light source 120 to generate a light. The housing 110 also includes a controller 150. The controller 150 is communicably coupled to the light source 120, the user interface 130, and the energy storage device 145 and controls the operation of the light source 120 based on user inputs received from the user interface 130. The controller 150 controls a power on/off of the light source based on a user input from at least one of the first switch 135 or the second switch 140, and the controller 150 controls one or more characteristics of the light source 120, which includes characteristics of the light produced by the light source 120, based on a user input from at least one of the first switch 135 or the second switch 140. In some embodiments, the light source 120 includes a plurality of light sources, and the controller 150 determines which light source(s) of the plurality of light sources in light source 120 to control based on a user input from at least one of the first switch 135 or the second switch 140.

The housing 110 includes a first end 112, a second end 114 opposite the first end 112, and extending between the first end 112 and the second end 114 a medial portion shown as grip 116. The grip 116 is configured to be gripped by a user operating the work light 100. The housing 110 may be a hollow body defining an interior space for containing and supporting one or more components of the work light 100 such as the light source 120, the user interface 130, the energy storage device 145, and the controller 150. The housing 110 may be made of multiple pieces coupled together or the housing 110 may be a seamless, one-piece body. The housing 110 may be made of a durable plastic or metal, including a thermoplastic elastomer, a reinforced nylon, ABS, aluminum, etc. Rotatably coupled to the housing 110 is a hook 118. The hook 118 is moveable between a first use position and a second stowed position, as discussed in further detail below with reference to FIGS. 3-5. The hook 118 includes a hook end 119 and a stem end 121.

The housing 110 supports the user interface 130. As shown, the user interface 130 includes the first switch 135 and the second switch 140. The first switch 135 is a trigger switch configured to be depressed and released by a user. In some embodiments, the first switch 135 may be a momentary switch wherein the first switch 135 is only in an "on" state when depressed or actuated, and otherwise returns to an "off" state when released. In other embodiments, the first switch 135 may be an alternate switch, such that the first switch 135 is 'on" when depressed and released, and is "off" when depressed and released a second consecutive time. While shown as a trigger switch, the first switch 135 may be another type of user interface such as a push button, a toggle switch, a slide switch, a selector switch, or a rotary switch.

The user interface 130 also includes the second switch 140. The second switch 140 is shown as a rotary switch such as a rotary encoder switch. In some embodiments, the second switch 140 may be an absolute rotary encoder switch or an incremental rotary encoder switch. In such embodiments where the second switch 140 is a rotary encoder switch, the second switch 140 includes a rotary disc and a switch body. The switch body may be positioned within the housing 110 and the rotary disc may be positioned outside the housing 110 such that user may interact with the second switch 140. In some embodiments, the second switch 140 is positioned such that a user may interact with the second switch 140 on each side of the work light 100. For example, a user gripping the grip 116 with their left hand would have one finger resting on the first switch 135, and their thumb would curl around the grip 116 and be positioned to actuate the second switch 140 on a left side of the housing 110. A user gripping the grip 116 in their right hand would have one finger resting on the first switch 135, and their thumb would curl around the grip 116 and be positioned to actuate the second switch 140 on a right side of the housing 110. The position of the second switch 140 at least partially within the housing 110 and yet accessible from both the left side and the right side of the housing 110 allows the functions of the work light 100 to be fully within reach to users operating the work light 100 in either hand.

Selectively coupled to the housing 110 is the energy storage device 145. The energy storage device 145 provides power to one or more components of the work light 100 such as the light source 120, the user interface 130, and the controller 150. The energy storage device 145 may be any type of portable energy storage device including a battery, a fuel cell, a supercapacitor, etc. In embodiments where the energy storage device 145 is a battery, the battery may be a lithium-ion battery, a nickel-cadmium battery, a nickel-metal hydride battery, a lead-acid battery, or another type of battery. The energy storage device 145 may be selectively coupled to the work light 100. For example, the energy storage device 145 may be removable from the work light 100 to be swapped with a new energy storage device 145. In some embodiments, the energy storage device 145 includes an interface to couple the work light 100 to an electrical grid such that the work light 100 operates as a wired work light 100. More specifically, in alternative embodiments, the work light 100 may be coupled to an adapter capable of plugging into an AC outlet and the work light 100 may be operable on AC power. Additionally, the work light 100 may be operable on capacitors.

Figure 2:
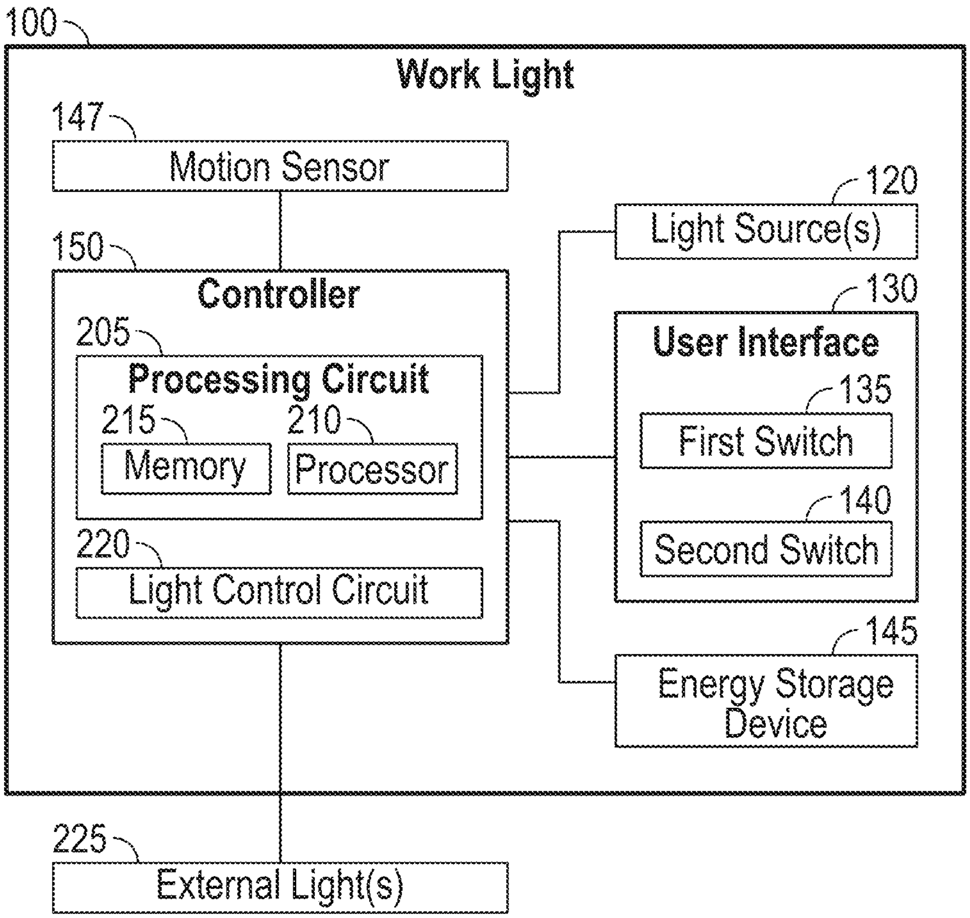
FIG. 2 is a block diagram illustrating the work light of FIG. 1 in a work site, according to an exemplary embodiment.

Referring now to FIG. 2, the work light 100 is shown in a work site as a block diagram. As shown, the controller 150 of the work light 100 includes a processing circuit 205 which includes processor 210 and memory 215. Processing circuit 205 can be communicably connected to light source 120, the user interface 130, the energy storage device 145, and the motion sensor 147, such that processing circuit 205 and the various components of work light 100 can send and receive data and/or power. Processor 210 can be implemented as a general-purpose processor, an application specific integrated circuit (ASIC), one or more field programmable gate arrays (FPGAs), a group of processing components, or other suitable electronic processing components.

Memory 215 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 215 can be or include volatile memory or non-volatile memory. Memory 215 can include database components, object code components, script components, or any other type of information structure for supporting the various activities and information structures described in the present application. According to an exemplary embodiment, memory 215 is communicably connected to processor 210 via processing circuit 205 and includes computer code for executing (e.g., by processing circuit 205 and/or processor 210) one or more processes described herein.

The controller 150 further includes a light control circuit 220. Using the light control circuit 220, the controller 150 controls the operation of one or more characteristics of the light source 120 based on one or more user inputs received from the user interface 130. In some embodiments, the light source 120 includes a plurality of individually addressable lights. In such embodiments, the controller 150 determines which lights of the plurality of individually addressable lights to operate based on a user input. In some embodiments, all of the lights of the plurality of individually addressable lights are operated. In other embodiments, only a subset of lights of the plurality of individually addressable lights are operated. The controller 150 may determine which lights of the plurality of individually addressable lights to operate based on the number of user inputs received within a predetermined period of time from the user interface 130. The predetermined time period is the period of time between complete user inputs from the user interface 130. For example, referring to the first switch 135 of the user interface 130, the predetermined time period is the period of time between release of the first switch 135 and the next depression of the first switch 135. In some embodiments, the controller 150 progresses through a predefined list of profiles or groups of lights to operate for each number of actuations of the switch that are within the predetermined time period. Accordingly, a first actuation of a switch as the first switch 135 results in a first predetermined group of lights of the light source 120 activating based on a first profile. If the first switch 135 is released and depressed again within the predetermined time period, then the controller 150 progresses to deactivate the first predetermined group of lights in the light source 120 and activate a second predetermined group of lights in the light source 120 based on a second profile. If the next depression fails outside the predetermined time period of the switch or the lights or later deactivated, the controller 150 resets a counter of the number of user inputs and begins again at a beginning of the predefined list of different predetermined sets or groups of lights in the light source 120 or profiles for operating the work light 100. The first predetermined group (i.e., profile) of lights may include only a single light of the light source 120, while the second predetermined group (i.e., profile) of lights may include all lights of the light source 120. In some embodiments, one or more lights in the first predetermined group of lights may also be operated in the second predetermined group of lights. The first and second user inputs may both be received from the same switch (e.g., first switch 135, second switch 140). For example, in response to actuation of the first switch 135 the controller 150 receives the first user input, and in response to another actuation of the first switch 135 the controller 150 receives the second user input. So long as each successive input is received before the predetermined time period between each input elapses, the controller 150 will progress to the next predetermined group or arrangement of lights in the light source 120.

Each actuation of the first switch 135 includes depressing the first switch 135, holding the first switch 135, and releasing the first switch 135. In some embodiments, when the first switch 135 is first depressed, the first user input is received, and the second user input is not received until the first switch 135 is released and depressed a second time. In some embodiments, as long as the first switch 135 is depressed, the controller 150 operates or activates the set of lights according to that user input, such as when the first switch 135 is a momentary switch. For example, in response to a user pressing the first switch 135 twice but holding the first switch 135 on the second press, the controller 150 would thereafter operate the set of lights associated with receiving two user inputs within the predetermined period of time, until the first switch 135 is released.

In some embodiments, the controller 150 also modifies or changes one or more characteristics of the light source 120 and/or the light generated by the light source 120 in response to a user input from the user interface 130. The characteristics the controller 150 may modify include a brightness, a color, a flood size, a focus, a color temperature, or a light type, amongst other characteristics. In some embodiments, one of the first switch 135 or the second switch 140 controls the state (e.g., power on/off) of the light source 120 or a portion of the light source 120, while the other of the first switch 135 or the second switch 140 adjusts or controls the one or more characteristics. For example, the first switch 135 may control the state of the light source 120 and the second switch 140 may control or adjust the one more characteristics such as a brightness of the light source 120. The first switch 135 and the second switch 140 may be operated concurrently or consecutively. A user operating the work light 100 may press the first switch 135 one or more times until the desired lights of the light source 120 are activated, and while the user's finger continues to depress the first switch 135 such that the lights of the light source 120 remain active, the user may use their thumb to actuate the second switch 140 to adjust a characteristic of the lights such as a brightness level of the lights of the light source 120 or a color of the light source 120. In this way the user can activate the desired number of light sources 120 and adjust a characteristic of the light source 120 such as the brightness using only a single hand, and without having to adjust their grip on the work light 100. The positioning of the first switch 135 and the second switch 140 thus facilitates ergonomical and ambidextrous control of the of the light source 120 and its characteristics.

In some embodiments, the controller 150 is communicably coupled to the motion sensor 147. The motion sensor 147 may an accelerometer, a gyroscope, an infrared sensor, an ultrasonic sensor, a radar sensor, or another type of sensor configured to detect motion of the work light 100 and/or in an environment around the work light 100. In some embodiments, the controller 150 controls the light source 120 based on or partly based on a signal from the motion sensor 147. For example, the controller 150 may deactivate the light source 120 when no motion (or no motion above a minimum threshold of motion) is detected for a period of time, such as 1 minute, 2 minutes, 5 minutes, etc. The period of time and/or the minimum threshold of motion may be depend on the type of motion sensor used (e.g., accelerometer, gyroscope, etc.). In some embodiments, the period of time is a predetermined period of time. In other embodiments, the predetermined period of time is set by a user. In some embodiments, the predetermined period of time is at least partially based on charge level or type of a power source for the work light 100. For example, a first predetermined period of time may be used when the energy storage device 145 is a battery at full charge, and a second predetermined period of time may be used when the energy storage device 145 is a battery below a charge threshold (e.g., 30%, 20%, 10%, etc.). In some embodiments where the work light 100 is coupled to an AC outlet, the controller 150 may disable and/or signal the signal from the motion sensor 147, and the light source 120 may remain on until actuated by a user.

In some embodiments, a work site includes an external light 225. The controller 150 is communicably coupled to the external light 225 such the controller 150 may also control a state and/or characteristic of the external light 225 in addition to and/or alternatively to the state and/or condition of the light source 120. The controller 150 may be coupled to the external light 225 over a WiFi, Bluetooth, Zigbee, cellular, or another type of wireless connection.

Figure 3:
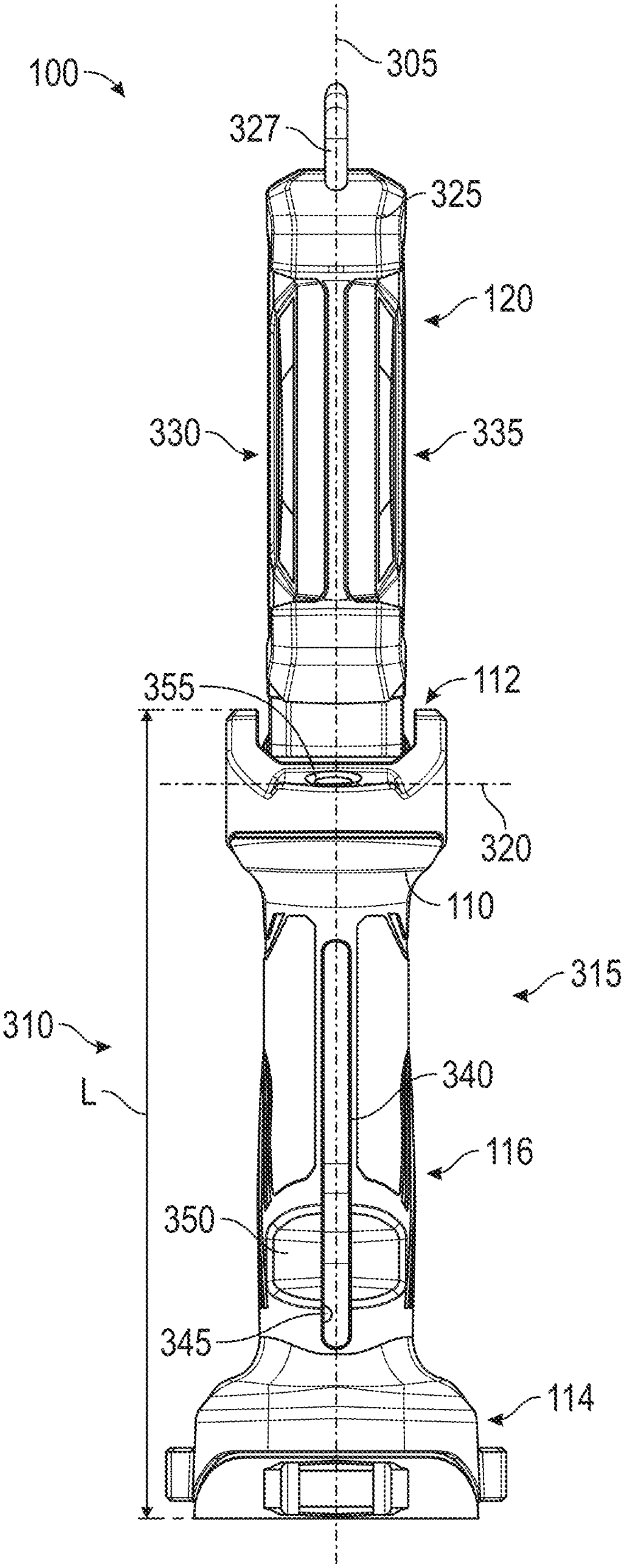
FIG. 3 is a rear view of the work light of FIG. 1, according to an exemplary embodiment.
Figure 4:
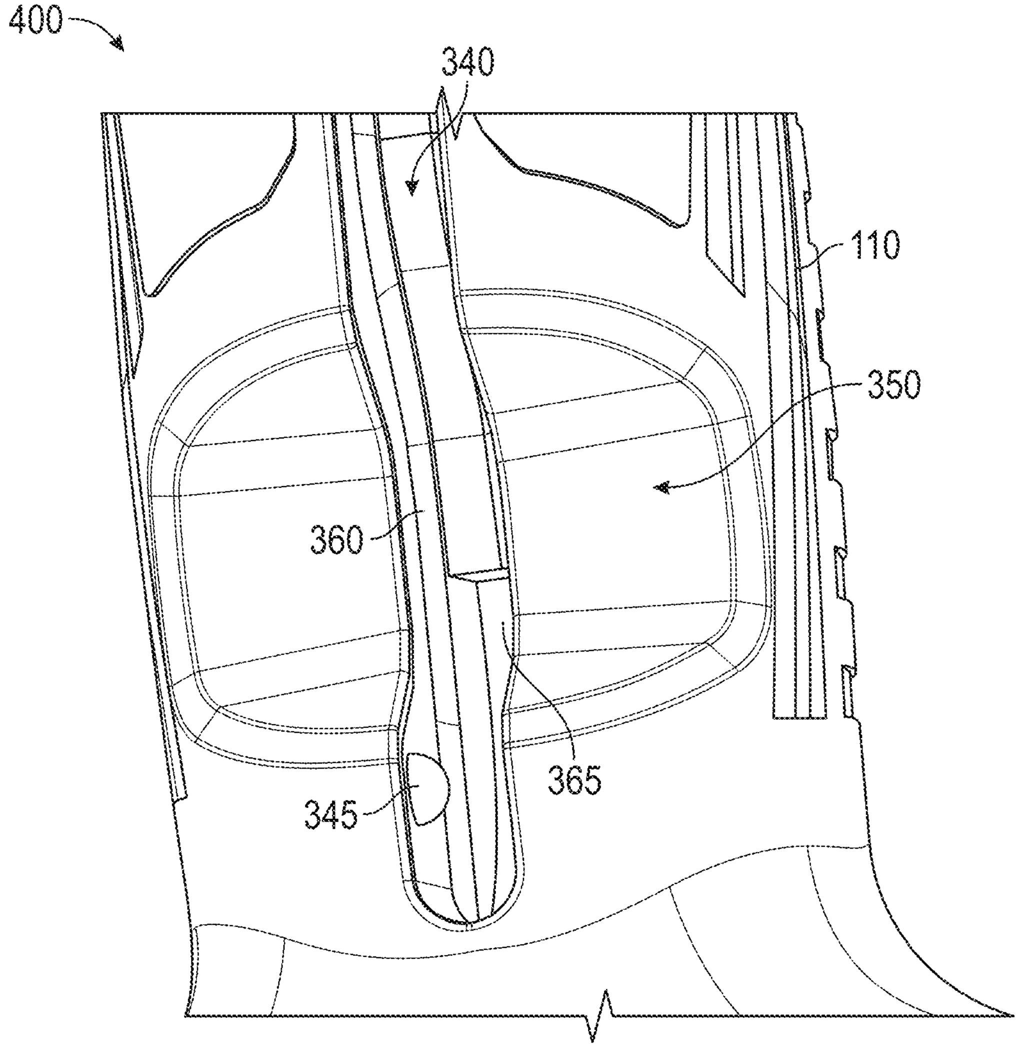
FIG. 4 is an enlarged perspective view of the rear of the work light of FIG. 1, according to an exemplary embodiment.

Referring now to FIGS. 3-4, the rear of the housing 110 is shown. As shown in FIG. 3, the housing 110 extends longitudinally along a vertical axis 305 and has a length L along the axis. The axis 305 divides the work light 100 between the right side 310 and the left side 315.

The light source 120 is coupled to the housing 110 near or proximate to the first end 112 of the housing 110. The light source 120 may be rotatably coupled to the housing 110 such that the light source 120 rotates relative to the housing 110 about an axis shown as lateral axis 320. In some embodiments, the light source 120 may rotate between 0 degrees and 180 degrees relative to the housing 110. In some embodiments, the light source 120 rotates between 0 degrees and 90 degrees relative to the housing 110. In some embodiments, the light source 120 may also spin or rotate around an axis parallel to the axis 305 relative to the housing 110.

The light source 120 includes a light housing 325 and a plurality of light sources, shown as a first light 330 on the right side 310 of the work light 100 and a second light 335 on the left side 315 of the work light 100. The first light 330 thus faces in the opposite direction as the second light 335. In some embodiments, light sources (e.g., first light 330, second light 335) may be positioned on one or more other faces of the light source 120. The light sources (e.g., first light 330, second light 335) may be of the same or different types including light emitting diodes (LED), incandescent, halogen, or fluorescent. In some embodiments, each of the first light 330 and the second light 335 are different types of lights, such that a user can select between the different types of lights as described herein according to the type of light which would best suit the users needs. In embodiments where the first light 330 and/or the second light 335 are LEDs, each of the first light 330 and/or the second light 335 may include a plurality of LEDs. One or more of the plurality of LEDs in each of the first light 330 and/or the second light 335 may vary in one or more aspects such as in their color, lumens, viewing angles, or type (e.g., surface mounted diodes, chip on board (COB), multiple chips on board (MCOB), multiple chips and cups on board (MC-COB), etc.). Accordingly, a single light such as first light 330 may include COB and SMD LEDs. For another example, a single light such as second light 335 may include both soft white and cool white LEDs such that the total color output of the second light 335 may be adjusted by varying which type of LEDs are active or by varying the brightness of the types of LEDs. At a top of the light housing 325 is a light hook 327. The light hook 327 defines an aperture 329 for hanging the work light 100 from the light hook 327. A portion of the light hook 327 may be inserted into a portion of the light source 120 in a retracted position, not shown, or in an extended position exposing the aperture 329.

Figure 5:
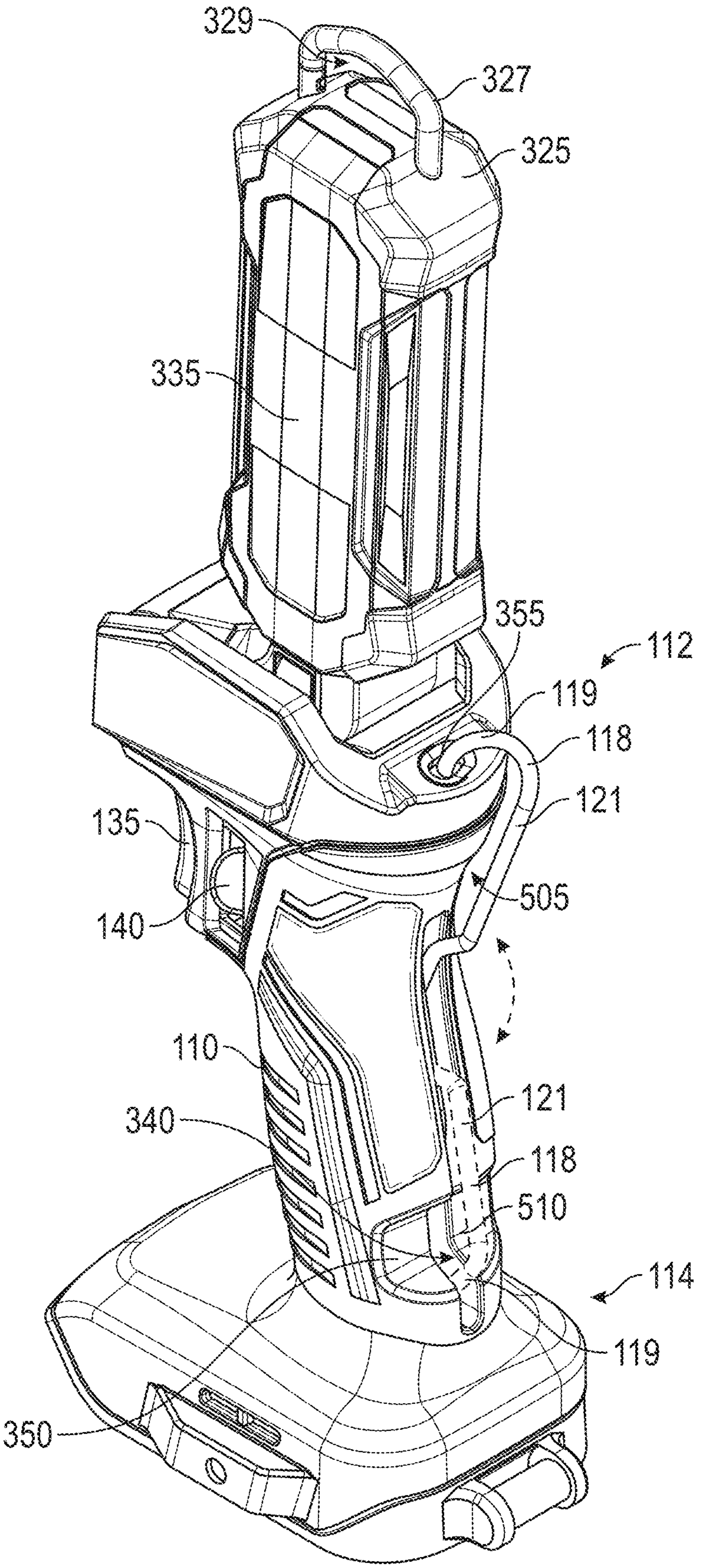
FIG. 5 is a rear perspective view of the work light of FIG. 1 with a moveable hook, according to an exemplary embodiment.

Referring now to FIGS. 3-5, in the rear of the housing is a channel shown as slot 340. The slot 340 is positioned within the grip 116 of the housing 110 and receives in some positions the hook 118. At a bottom of the slot 340 proximate the bottom second end 114 of the housing 110 is a retention protrusion 345. The protrusion 345 extends from the housing and at least partially into the slot 340. The protrusion 345 acts to at least partially retain the hook 118 in the slot 340. Also, proximate the bottom of the slot 340, a depth of the slot 340 into the housing 110 increases at a depression 365. The increased depth of the depression 365 allows the slot 340 to accommodate the curved shape of the hook 118. In a sidewall of the slot 340 is a groove 360. The groove 360 is sized to at least partially receive the hook 118. The groove 360 thereby at least partially retains the hook 118 in the slot 340. To insert the hook 118 into the groove 360, a user must apply a force to slightly deform the grip 116 of the housing 110, and the elastic deformation thereby holds the hook 118 in the slot 340.

Referring to FIGS. 3-5, above the protrusion 345 is a recessed portion 350. The recessed portion 350 extends at least partially into the housing 110 and allows a user to access and grab the hook 118 to remove the hook 118 from the slot 340 located in the housing 110. The recessed portion 350 also permits the user to apply force to the hook 118 to retain the hook 118 into the slot 340 located in the housing 110. Proximate the top first end 112 of the housing 110 is an index 355 to receive a portion of the hook end 119. The index 355 is a depression or aperture extending at least partially into the housing 110 to retain a portion of the hook end 119.

Referring now to FIG. 5, the hook 118 is rotatably coupled to the housing 110 such that the hook 118 may move between a first use position and a second stowed position. In some embodiments, the hook 118 may also spin or rotate relative to the housing 110 so the hook end 119 may be located near the first end 112 in the first use position and down towards the second end 114 in the second stowed position. In the first use position, the hook end 119 of the hook 118 may be received in the index 355 and the stem end 121 of the hook 118 is positioned within the slot 340. As positioned in the first use position, the hook 118 defines an aperture 505. Using the aperture 505 the work light 100 may be hung on a nail or other object at the work site to raise the work light 100 off the floor. The hook 118 may transition from the first use position to a second stowed position in the grip 116 of the housing 110. In the second stowed position, the hook 118 may spin 180 degrees relative to the housing 110 and the hook end 119 may be pressed into the slot 340 located near the second end 114, passing over the protrusion 345 such that the hook 118 is selectively secured or retained in the second stowed position. The recessed portion 350 of the grip 116 in tandem with the hook 118 in the second stowed position defines a second aperture, shown as aperture 510. A user may access the aperture 510 by inserting a finger between the hook 118 and the housing 110 to aid with moving the hook 118 away from the housing 110.

Figure 6:
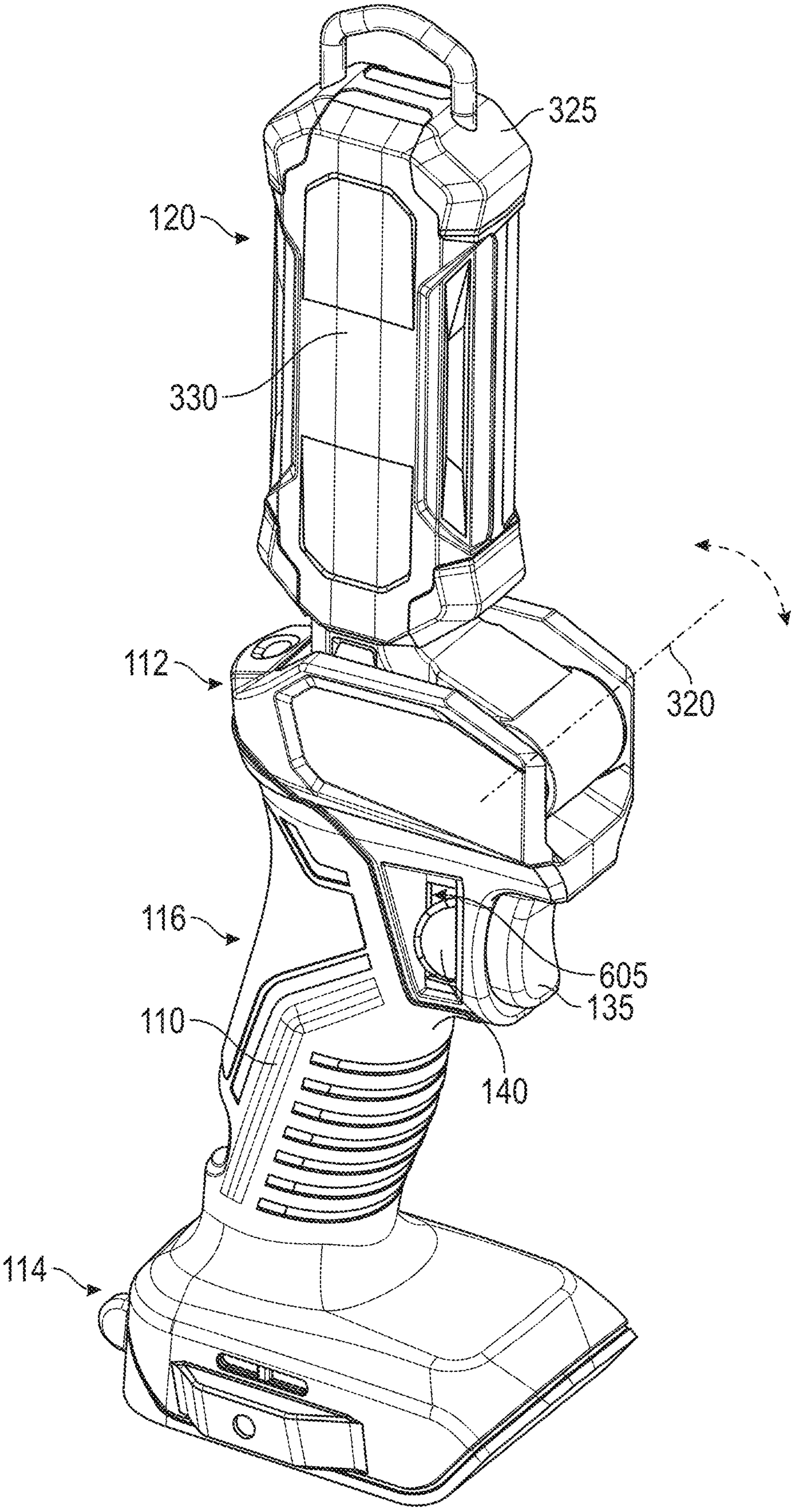
FIG. 6 is a perspective view of a left side of the work light of FIG. 1, according to an exemplary embodiment.
Figure 7:
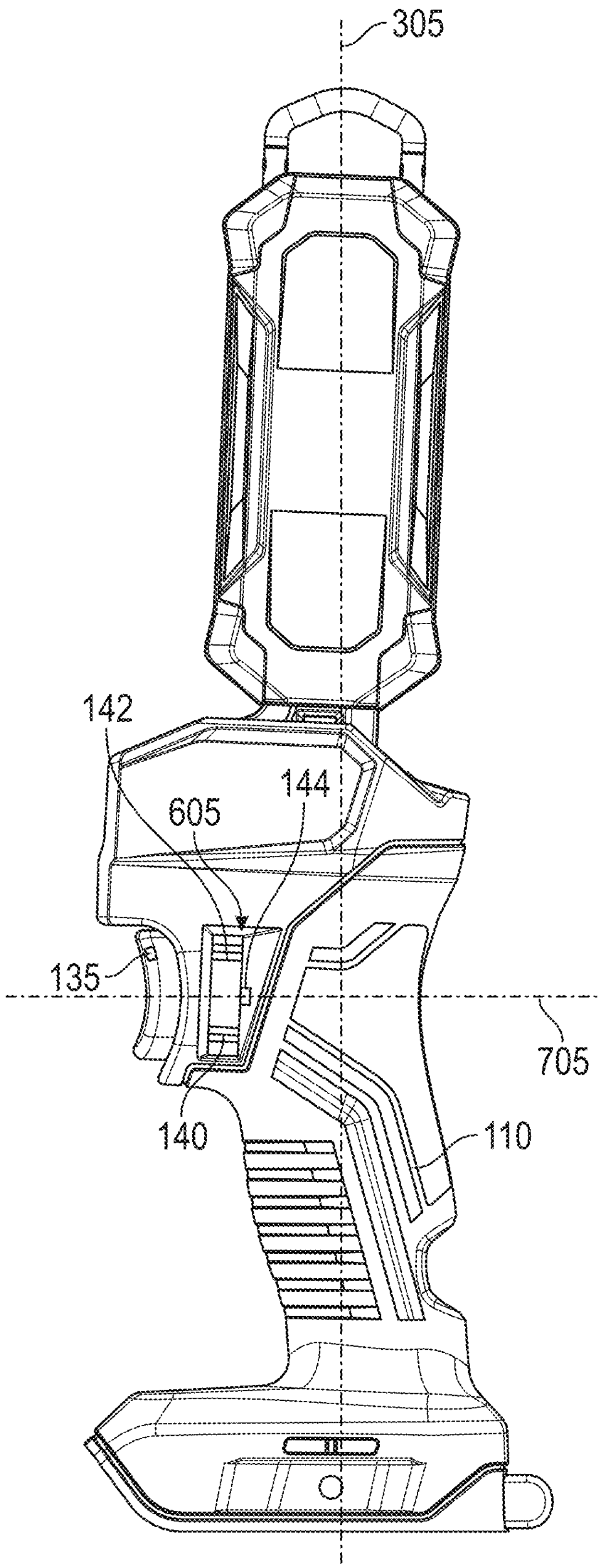
FIG. 7 is a right side view of the work light of FIG. 1, according to an exemplary embodiment.
Figure 8:
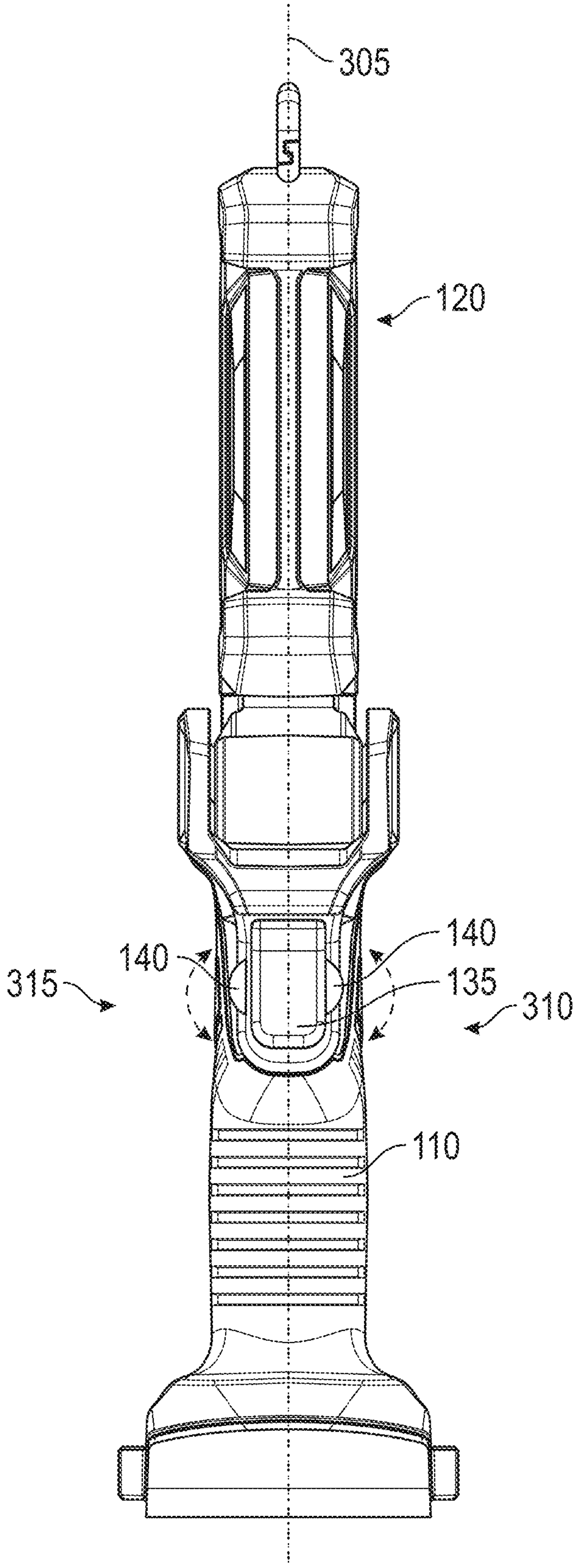
FIG. 8 is a front view of the work light of FIG. 1, according to an exemplary embodiment.

Referring now to FIGS. 6-8, the housing 110 includes a channel or aperture shown as channel 605. The channel 605 extends through the housing 110 from the left side 315 of the housing 110 to the right side 310 of the housing 110 and is radially offset from the longitudinal axis 305. Positioned at least partially within the channel 605 is the second switch 140, which is therefore also radially offset from the longitudinal axis 305 and is thus forward in the housing 110 near the first switch 135. In some embodiments, a dial or wheel 142 of the second switch 140 is positioned at least partially within the channel 605. The wheel 142 may be rotatable about a rotary axis 705 perpendicular to the longitudinal axis 305. The second switch 140 may also include a rotary encoder base, not shown, positioned in the housing 110. The rotary encoder base may be coupled to the wheel 142 via a shaft 144 extending from the housing 110 into the channel 605. The channel 605 is positioned radially between the first switch 135 and the longitudinal axis 305. In the channel 605, the second switch 140 rotates around the rotary axis 705. The first switch 135 also has an actuation axis along which the first switch 135 moves between a released position and a depressed position. In some embodiments, the actuation axis is also the rotary axis 705. In other embodiments, the actuation axis is parallel or substantially parallel to the rotary axis 705. In use, the first switch 135 moves towards and away from the second switch 140 along the rotary axis 705 while the second switch 140 rotates around the rotary axis 705.

In some embodiments, the second switch 140 is additionally translatable along an axis such as rotary axis 705 to receive a second user input from a user. In such embodiments, the second switch 140 may include a post extending from or being adjacent to the rotary disc. A portion of the post may be extend outside the housing 110 on the front side of the work light 100. The post associated with the second switch 140 may permit a user to actuate the second switch 140 along the axis to provide an additional user input. In some embodiments, the additional user input based on translation of the second switch 140 can accomplish the functions of the first switch 135, thereby allowing for a single switch to be capable of receiving two inputs from the user, one input directed towards the state of the work light 100 (i.e., as discussed herein with regards to the first switch 135) and the other input associated with one of the characteristics of the work light 100.

As best shown in FIG. 8, the second switch 140 extends out and beyond the ends of the channel 605 on the left side 315 and the right side 310 of the housing 110. In this way, at least a portion of the second switch 140 is exposed on each of the left side 315 and the right side 310 of the housing 110 for a user to engage. In use, a user can spin the second switch 140 up or down from both of the left side and the right side. Such an arrangement beneficially allows both the first switch 135 and the second switch 140 to be accessible no matter which hand is holding the work light 100. In some embodiments, the second switch 140 may be rotated an upwardly direction or downwardly direction on from one side of the housing 110. For example, the second switch 140 may only be accessed and rotated by the user on the left side 315 of the housing 110. In the alternative, the second switch 140 may only be accessed and rotated by the user on the right side 310 of the housing 110. In some embodiments, a diameter or width of the second switch 140 in a lateral direction perpendicular to the center longitudinal axis 305 is greater than a diameter or width of the first switch 135 such that the second switch 140 extends laterally beyond the first switch 135. Still in other embodiments, the width of the first switch 135 is greater than width of the second switch 140.

Figure 9:
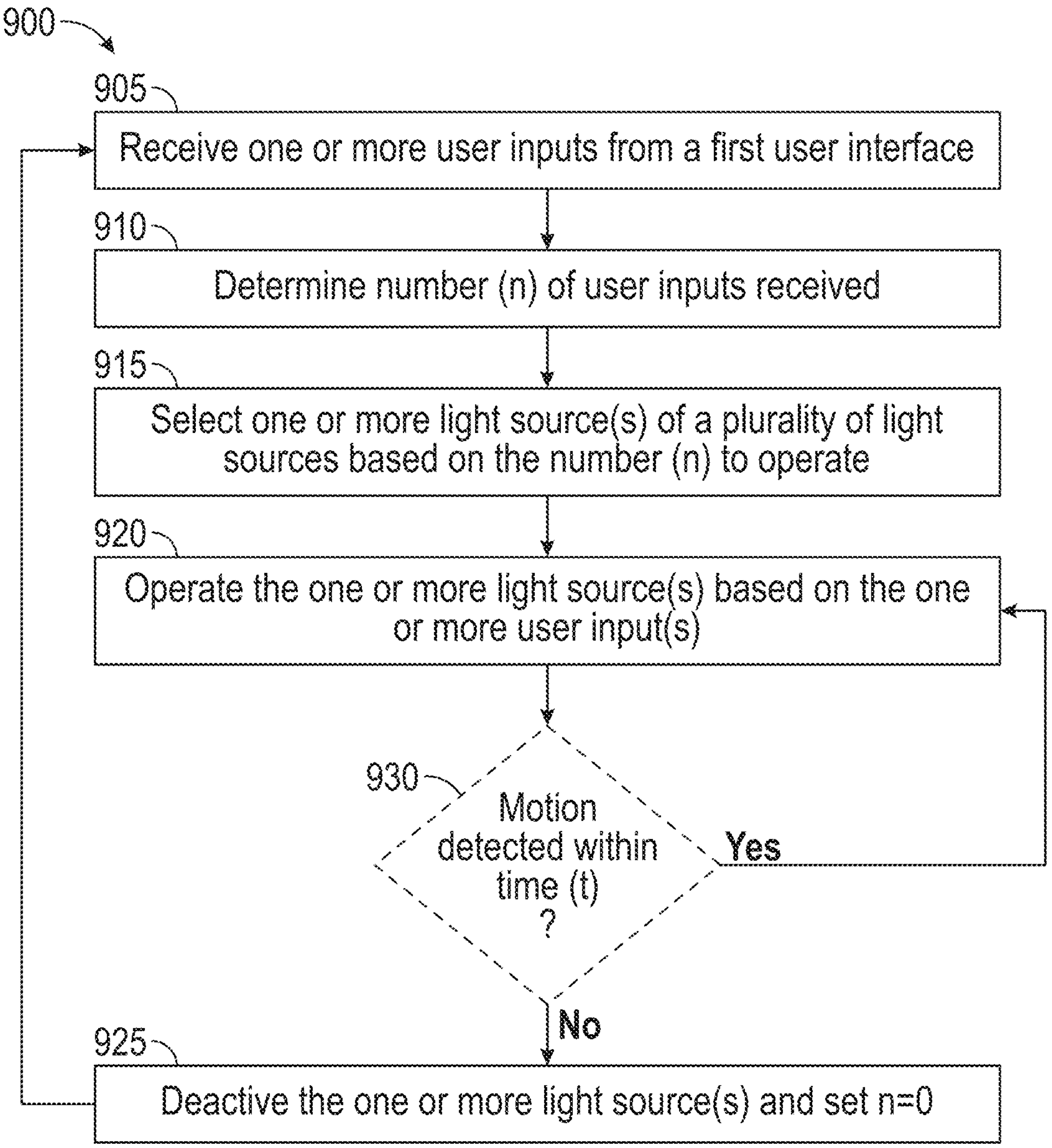
FIG. 9 is flow diagram of a process for controlling a work light, according to an exemplary embodiment.

Referring now to FIG. 9, a process 900 for operating a portable handheld light such as work light 100 is shown, according to an exemplary embodiment. One or more steps of the process 900 may be performed by the controller 150. It is to be understood that the steps of process 900 are not intended to be limiting, such that the process 900 may include more or fewer steps than those shown and that the steps of process 900 may be completed in any order. Step 905 includes receiving one or more user inputs from a first user interface. In some embodiments, the first user interface may be the first switch 135 while in other embodiments the first user interface may be the second switch 140. The one or more user inputs may include repeated actuations or presses of the first user interface. In embodiments the first user interface is the first switch 135, a complete actuation includes depressing and releasing the first switch 135, while a partial actuation includes depressing and holding the first switch 135. In step 905, the final actuation resulting in the final user input may be a partial actuation, such that the first switch 135 remains depressed in an "on" state and the controller 150 continues to receive the user input.

Step 910 includes determining the number (n) of user inputs received. In some embodiments, the controller 150 may count or track the number of user inputs (e.g., complete, and/or partial actuations) from the first switch 135 or the second switch 140 to determine a total number (n) of user inputs. As described above, each number (n) of user inputs may correspond to different groupings of lights in light source 120 based on different profiles from a plurality of profiles for controlling the function of the work light 100. Each profile may have one or more different characteristics relative to another profile to allow for variable control of the work light 100 based on the number (n) of user inputs. The characteristics may include a set or group of lights in the light source 120 to activate a brightness, a color, a pulse/ flash frequency, an on time, or another characteristic. For example, one user input (i.e., n=1) may correspond to a first profile for activating the first light 330 only, a second user input (i.e., n=2) may correspond to a second profile for activating the second light 335 only, a third user input (i.e., n=3 may correspond to a third profile activating both the first light 330 and the second light 335, and a fourth user input (i.e., n=2) may correspond to a fourth profile that deactivates any activated light, such as an off profile. In some embodiments, the controller is configured to control the work light 100 based on the user input (n) according to a plurality of predetermined profiles. In other embodiments, the profiles associated with each user input (n) may be customized by a user. For example, a user may associate an off profile with n=1 and a profile for activating the first light 330 with n=4. In some embodiments, the order of profiles is arranged with combinations more likely to be desired requiring fewer user inputs (n), and thus easier to access for a user. Thus, each time a user picks operates the work light 100 the work light 100 may start the more likely to be desired combination. Beneficially, this can decrease the average amount of time or user inputs required to operate the work light 100 with the desired light sources in the light source 120.

In alternative embodiments, each user input or actuation of the switch, such as the first switch 135, must be done before a predetermined time period (t) between each actuation elapses before the number (n) is reset. In some embodiments, after an amount of time x has elapsed where x is less than t, the predetermined time period is extended by x such that after the actuation the predetermined time period again equals t. In this manner, the predetermined time period t would continue to be extended for each actuation which occurs before the predetermined time period t elapses. In such embodiments, if the predetermined time period (t) elapses between a first actuation and a second actuation, the prior user inputs are not included in the number (n). The number (n) is may therefore be the number of user inputs received consecutively with less than a predetermined time t between each user input. In some embodiments, the predetermined time period may be between 0 and 2 seconds. For example, the predetermined time period may be 0.5 seconds. In such alternative embodiments, if prior to the time (t) elapsing an additional user input is received, the controller 150 increments the number (n) by one to account for the additional user input. If, however, the time (t) has elapsed without receiving an additional user input, the number (n) is set and the process 900 proceeds to step 915.

Step 915 includes selecting one or more light source(s) of a plurality of light sources are based on the number (n). In some embodiments, the controller 150 maintains a predefined list of various combinations of lights in the light source 120 (e.g., profiles). For example, the predefined list may include groups or sets or profiles of lights such as a first profile including the first light 330, a second profile including the second light 335, and a third profile including the first light 330 and the second light 335. The number of profiles and combinations may vary based on the number of independently addressable lights in the light source 120. Each profile may be associated with a number (n). For example, the first profile corresponding to the first light 330 may be associated with n=1, the second profile corresponding to the second light 335 may be associated with n=2, and third profile corresponding to both the first light 330 and the second light 335 together may be associated with n=3. Thus, based on the number (n) determined at step 910, the group of combination of lights of light source 120 is selected at step 915.

At step 920, the one or more light source(s) corresponding to the number (n) are operated based on the one or more user inputs (n). In some embodiments, operating the lights includes activating the lights to illuminate an area. In some embodiments, as described above, the light source(s) are operated according to the profile corresponding to the user input (n).

At step 925, the light source(s) are deactivated. In some embodiments, the light source(s) are operated so long as a final user input in the one or more user inputs remains on. For example, if the first switch 135 is a momentary switch, step 920 occurs so long as the first switch 135 remains depressed and in the "on" state. If the first switch 135 is released, at step 920 the user input is thus removed, and the lights may be deactivated or turned off. In alternative embodiments, the lights are operated for a predetermined period of time and then deactivated, such as for example according to a sleep timer. The sleep timer may be a predetermined amount of time and/or an amount of time based on one or more characteristics of the energy storage device 145 or the power source of the work light 100 (e.g., charge level, presence of AC outlet connection, etc.). In some embodiments, the process 900 includes step 930. At step 930, the controller 150 determines if motion is detected within time (t). The controller 150 may be coupled to a motion sensor such as motion sensor 147 and receive a signal indicative of motion at or above a threshold level of motion. In some embodiments, so long as motion is detected within time (t), the light source(s) remain in the on state until no motion (or no motion at or above the threshold) is detected within time (t). If no motion (or no motion above a threshold) is detected within time (t) such embodiments, the process 900 then proceeds to step 925 and deactivates the one or more light source(s).

In some embodiments, step 930 includes setting n=0. In such embodiments, the controller 150 resets the counter (n) and the process 900 then proceeds back to step 905. This allows for the work light 100 to be reset and ready for the next time a user input is received. In some embodiments, step 930 may be repeated and/or occur after step 925. In such embodiments, if motion is detected within time (t) after the light source(s) have been deactivated, the controller 150 may be configured to reactive the light source(s) and operate the one or more light source(s) based on the one or more user input(s).

At any time during the process 900, the controller 150 may receive a user input from a second user interface different than the first user interface. For example, the first user interface may be the first switch 135, and the second user interface may be the second switch 140. Upon receiving a user input from the second user interface, the controller 150 may adjust one or more characteristics of the light from the work light 100. For example, in response to a user input including rotating the second switch 140 in an upwardly direction, away from the first end 112, the controller 150 may be configured to increase the brightness of the one or more light source(s) operated at the time, and in response to a user input rotating the second switch 140 in a downwardly direction, towards the first end 112, the controller 150 may be configured to decrease a brightness of the one or more light source(s). The one or more characteristics may include a brightness, a color, a flood size, a focus, a color temperature, or a light type, amongst other characteristics. In some embodiments, multiple characteristics may be adjusted in response to the same user input from the second user interface. In some embodiments rotation of the second switch 140 in a first direction changes a first characteristic of the one or more light source(s), while rotation of the second switch 140 in a second direction opposite the first direction changes a second characteristic of the one or more light source(s).

In some embodiments, each combination of light sources in the predefined list of combinations or groups/profiles is associated with a characteristic to be adjusted. For example, if n=1 and the profile indicates the first light 330 should be operated on its own, the characteristic to be adjusted by one of the switches (e.g., the first switch 135 or the second switch 140) may be a brightness. However, if n=2 and the predefined list indicates the second light 335 should be operated on its own, the characteristic may be a color. However, in some embodiments, different groups or profiles may allow adjustment of the same characteristic.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members, or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A light comprising:
- a housing extending along a center longitudinal axis and comprising:
  - a first end;
  - a second end opposite the first end;
  - a grip extending between the first end and the second end; and
  - a channel extending from a left side of the housing to a right side of the housing;
- a light source rotatably coupled to the housing proximate the first end;
- an energy storage device selectively coupled to the housing proximate the second end; and
- a user interface coupled to the energy storage device and the light source to selectively control operation of the light source, the user interface comprising:
  - a first switch; and
  - a second switch positioned at least partially within the channel, wherein the second switch extends beyond the channel on the left side and the right side of the housing.

2. The light of claim 1, wherein a portion of the second switch between the left side and the right side is positioned within the channel.

3. The light of claim 1, wherein the second switch is positioned radially between the first switch and the center longitudinal axis.

4. The light of claim 1, further comprising:
- the first switch comprising an actuation axis wherein the first switch is configured to move along the actuation axis; and
- the second switch comprising a rotary switch with a rotary axis substantially parallel with the actuation axis.

5. The light of claim 4, wherein the actuation axis is substantially perpendicular with the channel.

6. The light of claim 1, wherein the second switch comprises a rotary dial positioned in the channel and coupled to a rotary encoder base positioned within the housing.

7. The light of claim 1, wherein the first switch and the second switch are positioned within the grip of the housing.

8. The light of claim 1, wherein the light source is a plurality of light sources.

9. The light of claim 8, further comprising:

a controller configured to:

receive a first user input from the user interface;

control one or more of the plurality of light sources based on the first user input;

receive a second user input from the user interface; and control a characteristic of the one or more of the plurality of light sources based on the second user input.

10. The light of claim 9, wherein the first user input is from one of the first switch or the second switch and the second user input is from the other of the first switch or the second switch.

11. A portable light, comprising:

a housing comprising a first end and a second end opposite the first end;

a plurality of light sources rotatably coupled to the housing proximate the first end;

an energy storage device selectively coupled to the housing proximate the second end;

a user interface coupled to the energy storage device and the plurality of light sources to selectively control operation of one or more of the plurality of light sources, the user interface comprising a switch extending beyond a left side of the housing and a right side of the housing, wherein the switch is accessible from each of the left side and the right side of the housing; and a controller configured to:

receive a first user input from the user interface;

control a first set of lights from the plurality of light sources based on the first user input;

receive a second user input from the user interface; and control a characteristic of the one or more of the plurality of light sources based on the second user input.

12. The portable light of claim 11, wherein the controller is further configured to:

receive a third user input from the user interface; and control a second set of lights from the plurality of light sources based on the third user input.

13. The portable light of claim 12, wherein the switch is a first switch, wherein the user interface comprises a second switch, and wherein the controller is further configured to:

receive the first user input from the second switch;

receive the second user input from the first switch; and receive the third user input from the second switch.

14. The portable light of claim 11, wherein the switch is a first switch, wherein the user interface further comprises a second switch, and wherein the controller is further configured to:

receive the first user input from the first switch; and receive the second user input from the second switch.

15. The portable light of claim 14, wherein the first switch is a rotary encoder switch and the second switch is a momentary switch.

16. The portable light of claim 14, wherein the housing comprises a channel extending from a left side of the housing to a right side of the housing, and wherein the first switch is positioned at least partially within the channel.

17. A portable light, comprising:

a first housing extending along a center longitudinal axis and comprising:

a first end;

a second end opposite the first end; and a grip extending between the first end and the second end;

a second housing rotatably coupled to the first housing proximate the first end, the second housing comprising a plurality of light sources;

an energy storage device selectively coupled to the first housing proximate the second end;

a user interface coupled to the first housing to selectively control operation of one or more of the plurality of light sources, wherein the user interface comprises:

a first switch; and a second switch positioned at least partially within the first housing and extending beyond a left side of the first housing and a right side of the first housing, wherein the second switch is accessible from each of the left side and the right side of the first housing; and a controller configured to:

receive a first input from the first switch;

control a first set of light sources from the plurality of light sources based on the first input;

receive a second input from the first switch; and control a second set of light sources from the plurality of light sources based on the second input, wherein the second set is different than the first set.

18. The portable light of claim 17, wherein the controller is further configured to:

receive a third input from the second switch to adjust a characteristic of at least one of the first set of light sources or the second set of light sources.

19. The portable light of claim 18, wherein the characteristic is a brightness.

20. The portable light of claim 17, further comprising a hook rotatably coupled to the first housing, the hook moveable between a first position wherein the hook and the first housing define an aperture and a second position wherein the hook is at least partially positioned within a groove of the first housing.

* * * * *